Jan. 24, 1939.  R. L. MILLER  2,144,847
IMPULSE PRODUCING CIRCUIT
Filed Nov. 18, 1936
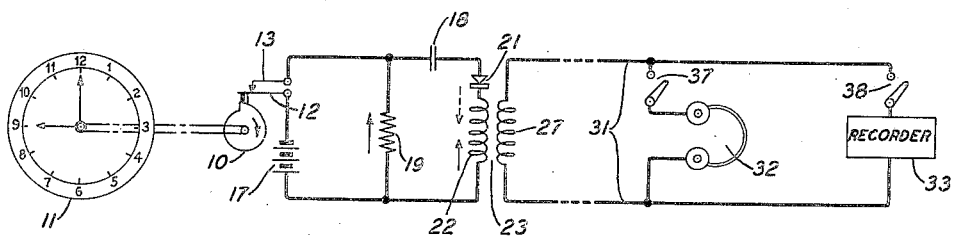
INVENTOR
R. L. MILLER
BY
*H. A. Burgess*
ATTORNEY Patented Jan. 24, 1939

2,144,847

UNITED STATES PATENT OFFICE 2,144,847

IMPULSE PRODUCING CIRCUIT

Ralph L. Miller, Bloomfield, N. J., assignor to Bell Telephone Laboratories, Incorporated, New York, N. Y., a corporation of New York Application November 18, 1936, Serial No. 111,398

8 Claims. (Cl. 175—373)

This invention relates to an impulse producing circuit and particularly to such a circuit including a condenser which is charged and discharged at periodic intervals.

An object of the invention is to render readily distinguishable impulses produced by discharge of the condenser from impulses produced by charging of the condenser.

It is more or less common practice to utilize a condenser, charged and discharged at periodic intervals, to produce impulses for various purposes in electrical circuits. In certain instances of the use of such an arrangement it has been found desirable to be able to distinguish the impulses produced by discharge of the condenser from those produced by charging of the condenser and vice versa. One type of impulse may be the significant one for which the circuit is being used and, for this reason, a person monitoring on the circuit may wish to pick out such impulses and to disregard the other type of impulses. Also, if the impulses are being recorded it may be desirable to record only the significant impulses or at least to record the significant impulses in such a manner that they will be readily distinguishable from the other recorded impulses.

In accordance with a feature of the present invention, the amplitude of the significant type of impulses is caused to be materially greater than the amplitude of the other type of impulses whereby the significant type of impulses may be readily distinguished from the other impulses.

In accordance with a specific embodiment of the invention a unidirectional current conducting device, such as a copper-oxide rectifier, is so associated with the condenser and other elements of the impulse producing circuit that the impedance offered to the discharge impulses is much less than that offered to the charge impulses. Since the amplitude of the impulses decreases as the impedance of the circuit increases and vice versa it follows that the amplitude of the discharge impulses will be substantially greater than that of the charge impulses.

A thorough understanding of the invention and of the various advantageous features thereof may be gained from consideration of the following detailed description in connection with the accompanying drawing, the single figure of which shows an impulse producing circuit utilizing an embodiment of the invention.

Referring now to the drawing the arrangement illustrated may be utilized, to mention only one possible application by way of example, in checking the operation of a time indicating device, impulses produced at one point under control of the clockwork mechanism being transmitted to a central location where the impulses may be recorded and compared with standard time signals. In such a checking system the significant impulses which it is desirable to record are usually the discharge impulses, that is, the impulses occurring when the circuit is abruptly opened by the clockwork controlled mechanism. Cam 10 is shown in the drawing driven at a regulated rate by a clock mechanism 11. The cam controls the position of contact spring 12 which cooperates with contact 13 to open and close the impulse producing circuit. When the circuit is closed, as shown in the drawing, current from battery 17 flows in the direction indicated by the arrows (full lines), condenser 18 being charged to the voltage of the battery due to the voltage drop across resistance 19. Due to the action of rectifier 21 which is connected in series with primary winding 22 of repeat coil 23, the impedance offered to the current passing through the primary winding in the charging direction is relatively large so that the amplitude of the impulse now induced in the secondary 27, i. e., the "charge" impulse, is relatively low. While it is desirable that the value of resistance 19 be relatively high, it must be substantially less than the "reverse" resistance of rectifier 21, i. e., the resistance offered thereby to currents in the charging direction.

Now as cam 10 is rotated in a clockwise direction, a short distance from the position illustrated, contact spring 12 drops down opening the impulse producing circuit at contact 13 whereby condenser 18 discharges abruptly through primary 22 of repeat coil 23 in the direction indicated by the arrow (broken line) thereby inducing an impulse in secondary 27 of the repeat coil. The impedance offered to the discharge current by rectifier 21 is practically nil so that the amplitude of the "discharge" impulse now induced in secondary 27 is much greater than that of the "charge" impulse, rectifier 21, as previously pointed out, offering a high impedance to the "charge" impulse.

Secondary winding 27 of the repeat coil is connected across line 31 which leads to a remote observing point where headset 32 and recorder 33 are provided being connected as desired across line 31 under control of switches 37 and 38. The impulses may be listened to by means of the headset and the significant impulses (i. e. the "discharge" impulses) may be readily distinguished from the "charge" impulses by the listener due to their substantially greater amplitude. If the impulses are recorded on recorder 33 which may be of any suitable type, for example, a spark chronograph, the substantial difference in amplitude of the two types of impulses renders possible the recording thereof in a distinguishable manner. In fact by proper choice of circuit elements the amplitude of the "charge" impulses may be rendered so small that these impulses will not be recorded, only the significant "discharge" impulses being recorded.

While a certain specific embodiment of the invention has been selected for detailed description the invention is not limited in its application to the embodiment described. The embodiment described should be taken as illustrative of the invention rather than as restrictive thereof.

What is claimed is:

1. In an impulse producing circuit including a condenser and means for periodically charging and discharging said condenser, means for utilizing the charge and discharge impulses to produce sound, and means conductively associated with the charging and discharging paths of the impulse producing circuit for so modifying the characteristics of the charge impulses as compared to the discharge impulses that said charge impulses and said discharge impulses shall be readily distinguishable one from the other by the sounds which they produce.

2. In an impulse producing circuit including a condenser and means for periodically charging and discharging said condenser, means for rendering the charge impulses distinguishable from the discharge impulses, said last-mentioned means being conductively associated with the charging and discharging paths of said condenser and being effective to cause a substantial difference in the impedance offered by said impulse producing circuit to the charging currents as compared to the impedance offered to the discharge currents.

3. In an impulse producing circuit including a condenser and means for periodically charging and discharging said condenser, means for rendering the charge impulses distinguishable from the discharge impulses, said last-mentioned means comprising a rectifier associated with the charging and discharging paths of said condenser and effective to present a relatively high impedance to currents in one direction with regard to said condenser and a relatively low impedance to currents in the opposite direction with regard to said condenser.

4. In combination, an impulse producing circuit, including a condenser and means for periodically charging and discharging said condenser, a line, means for coupling the output of said condenser to said line, and means connected between said condenser and said coupling means conductively associated with the charging and discharging paths of said condenser and effective to provide a relatively high impedance to currents passing through said coupling means in one direction and a relatively low impedance to currents passing through said coupling means in the opposite direction.

5. In combination, an impulse producing circuit including a condenser and means for periodically charging and discharging said condenser, a line, a multi-winding inductive device for electrically coupling said impulse producing circuit and said line, and a rectifier in said impulse producing circuit, said rectifier being connected in series with one terminal of said condenser and one terminal of one winding of said coupling device and being effective to cause a substantial difference in the amplitude of impulses passing through said one winding in one direction from the amplitude of impulses passing through said one winding in the opposite direction, said winding being included in the charging and discharging paths of said condenser.

6. In an impulse producing circuit including a condenser and means for periodically charging and discharging said condenser, means for so modifying the characteristics of the charge impulses as compared to the discharge impulses that said charge impulses and said discharge impulses shall be readily distinguishable one from the other, said means being conductive both with respect to the charge impulses and with respect to said discharge impulses but to a substantially greater degree with respect to one type of said impulses than with respect to the other type.

7. In an impulse producing circuit including a condenser and means for periodically charging and discharging said condenser, means for causing a substantial difference in the amplitude of the charge impulses from the amplitude of the discharge impulses, said means being conductive with respect both to said charge impulses and said discharge impulses but offering a substantially greater impedance to one type of said impulses than to the other type.

8. In an impulsing circuit, a source of current in series relation with: an interrupter, a condenser, an imperfect rectifier and an indicating device; said source being poled to send reverse current through said rectifier and said indicating device into said condenser when said interrupter is in circuit closing position to charge said condenser, a discharge path for permitting said condenser to discharge through said rectifier in its low resistance direction into said indicating device when the interrupter opens the charging circuit, and means for operating said interrupter periodically to open and close said charging circuit.

RALPH L. MILLER.